United States Patent [19]

Kelly et al.

[11] 3,890,469

[45] June 17, 1975

[54] TIME DIVISION SWITCHING SYSTEM

[75] Inventors: Michael J. Kelly, Melrose Park; Satyan G. Pitroda, Villa Park, both of Ill.

[73] Assignee: GTE Automatic Electric Laboratories Incorporated, Northlake, Ill.

[22] Filed: Dec. 4, 1973

[21] Appl. No.: 421,701

[52] U.S. Cl. ........................ 179/15 AT; 179/15 AQ

[51] Int. Cl. ............................................ H04j 3/00

[58] Field of Search ........ 179/15 AQ, 15 AC, 15 A, 179/15 AT, 15 BS, 18 GF

[56] References Cited

UNITED STATES PATENTS

| | | | |
|---|---|---|---|
| 3,558,823 | 1/1971 | Brilliant | 179/15 AC |
| 3,736,381 | 5/1973 | Johnson | 179/15 AQ |
| 3,752,931 | 8/1973 | Verstegen | 179/15 AQ |
| 3,761,894 | 9/1973 | Pilc | 179/15 AQ |
| 3,787,820 | 1/1974 | Sherman | 179/15 A |

*Primary Examiner*—David L. Stewart

[57] ABSTRACT

A plurality of 24-channel, 8-bit time division multiplex carrier lines are inserted with coding data in each channels thereof to identify the PCM data being transmitted. A first multiplexer unit multiplexes and distributes the PCM data and the address coding data of each channel of a predetermined number of the multiplex lines onto a supermultiplexed highway carrier known as a long digital link. Preselected channels of the supermultiplexed highway are used to carry a special channel identification pattern inserted by a channel identification inserter operating within the first multiplexer unit. A channel aligner associated with the supermultiplexed highway is used to recognize the special pattern and align all data for being inputted to a time switch which receives a plurality of the supermultiplexed highways. The time switch includes a second multiplexer unit and a number of input buffer memory stores for distrubuting and storing the PCM data according to the coding of the channel address data to achieve a lower channel occupancy level per line of the PCM data as PCM information is presented to the input ports of a space switching network on a greater plurality of lines than the supermultiplexed input lines.

10 Claims, 8 Drawing Figures

PATENTED JUN 17 1975 3,890,469

SHEET 2

TIME DIVISION SWITCHING SYSTEM

BACKGROUND

This invention relates to time division switching systems useful in the art of telephonic communications and more particularly relates to a large capacity toll telephone system for switching TDM PCM digital data presented by a large number of incoming T1 carrier lines.

With the advent of time division multiplexed pulse code modulated digital data format such as the now well known T1 and T2 carriers, it is now possible to greatly increase the numbers of communications connections which can be made utilizing time division multiplexing within the telephone switching network or exchange. However, it is known that substantial blocking problems can occur in time and space division switching networks. U.S. Pat. No. 3,736,381 granted May 29, 1973 and assigned to Bell Telephone Laboratories, Incorporated, discusses such blocking problems within digital switching networks with which the present invention is similarly concerned. As is stated therein, to provide a totally non-blocking switching system is very expensive and non-economical as compared to providing a switching system having a known and improved blocking characteristic, i.e., essentially non-blocking. While the time division switching system of the above-referenced Bell patent presented an improved multistage time and space division network utilizing buffer memories for time switching, such a system does require frame aligned information to be received at the initial or first level multiplexing input port to the switching system. There is also required a special framing format for a first level multiplexed input line, i.e., a line carrying multiplexed data from several input T1 carrier lines, thus requiring its own associated framing detector. Furthermore, the referenced Bell switching system utilizes two identical buffer memory networks for each inlet line and a complex (64 × 64) gating structure for the decorrelator and recorrelator circuits. It is the intention of applicant to present a yet further improved time division digital switching system having similar channel or traffic distribution capabilities and wherein the implemented hardware is significantly reduced.

SUMMARY

It is therefore an object of the invention to provide a time-space-time digital switching system with essentially non-blocking characteristics providing improved traffic distribution through a load balancing or averaging pattern.

In a time division switching system, line interface equipment individually associated with each of a plurality of incoming T1 multiplex data lines arranged in serial multiplexed 24 channel, 8 bit time frame format for providing synchronization and frame detection of data arriving at a network inlet of said switching system, channel address generator means providing channel address bits for accompanying said 8 bit data format of each channel of each time frame, line multiplexer means associated with a predetermined number of said T1 multiplex lines for multiplexing said data and said address bits thereof to provide a second and serial multiplexed 128 channel, 16 bit time frame format, channel identification inserter means associated with said line multiplexer means and adapted to insert an identifiable bit pattern into a selected channel position of said second time frame format, long digital link carrier means associated with each line multiplexer means for carrier transmission of said second time frame format, channel aligner means associated with each link carrier means for aligning the transmission of said second time frame format with repeating occurrences of said inserted bit pattern, a plurality of first buffer memory means, link multiplexer means associated with a predetermined plurality of said link carrier means for distributing said data of said second time frame format between said plurality of first memory means for storage therein in accordance with the coding of said address bits thereof to achieve a channel occupancy level per line lower than that of said second time frame format, a controlled space switching network connected to the output of said first memory means for switching the stored data therefrom, and a like plurality of second buffer memory means receiving said switched data from said switching network and storing the same in a like distribution pattern.

In an illustrative embodiment of this invention, one line interface and one channel address generator are individually associated with each input T1 multiplex line and the PCM information on i number of such T1 lines is multiplexed by a line multiplexer for entry onto a higher order long digital link or bus. A channel identification inserter pattern is generated within the line multiplexer and entered onto the higher order bus for the purpose of identifying the start of related groups of channels comprising one higher order time frame. A channel aligner is individually associated with each higher order bus for initially recognizing the inserter pattern and processing thereafter the information within each higher order time frame in a particular manner in accordance with the invention. In particular, the information of one higher order time frame consists of 8 PCM information or voice bits, seven channel address bits and a parity bit for a total of 16 bits per channel. Thereafter, link multiplexer equipment separately distributes the PCM bits to predetermined ones of a plurality of input buffer memories in accordance with a selection determined by the channel address bits. In accordance with the invention, the traffic loading of the inlet T1 lines which tends to be unevenly distributed among the available channels is redistributed in a load balancing pattern through distributing $x$ out of $y$ channels to $m$ number of memory units and providing from said memory units $z$ out of $y$ channels to a space switching network, wherein $x$ is greater than $z$ and less than $y$ and each memory unit contains $y$ number of internal memory word slots. The space switching network is computer controlled by a standard central processor unit and the load balanced PCM information stored in the input buffer memory units can be selectively transferred from the input buffer memories across the space switching network for storage within a like number of associated output buffer memories in a like traffic distribution under control of the central processor.

DRAWING

Figure 3:
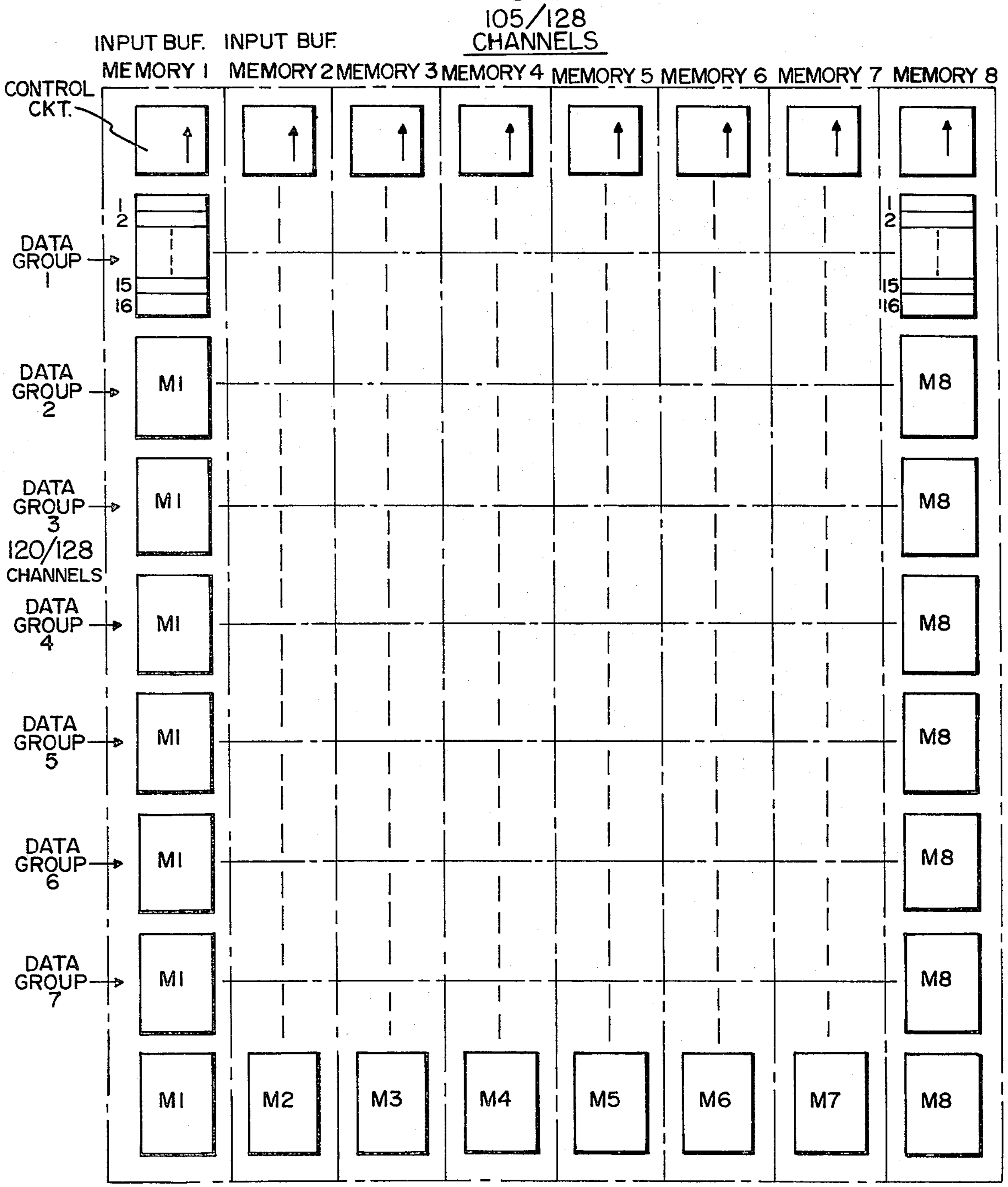
FIG. 3 is a graphical representation of the traffic distribution obtained from a link multiplexer storing PCM data into a preselected number of buffer memories according to a predetermined pattern.
Figure 7:
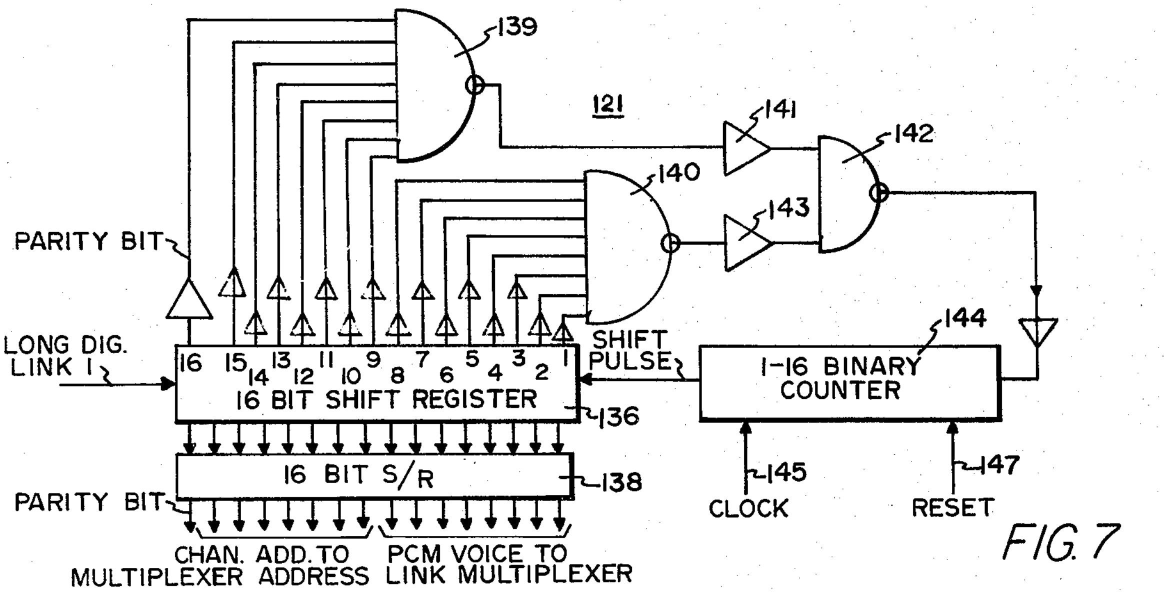
Figure 8:
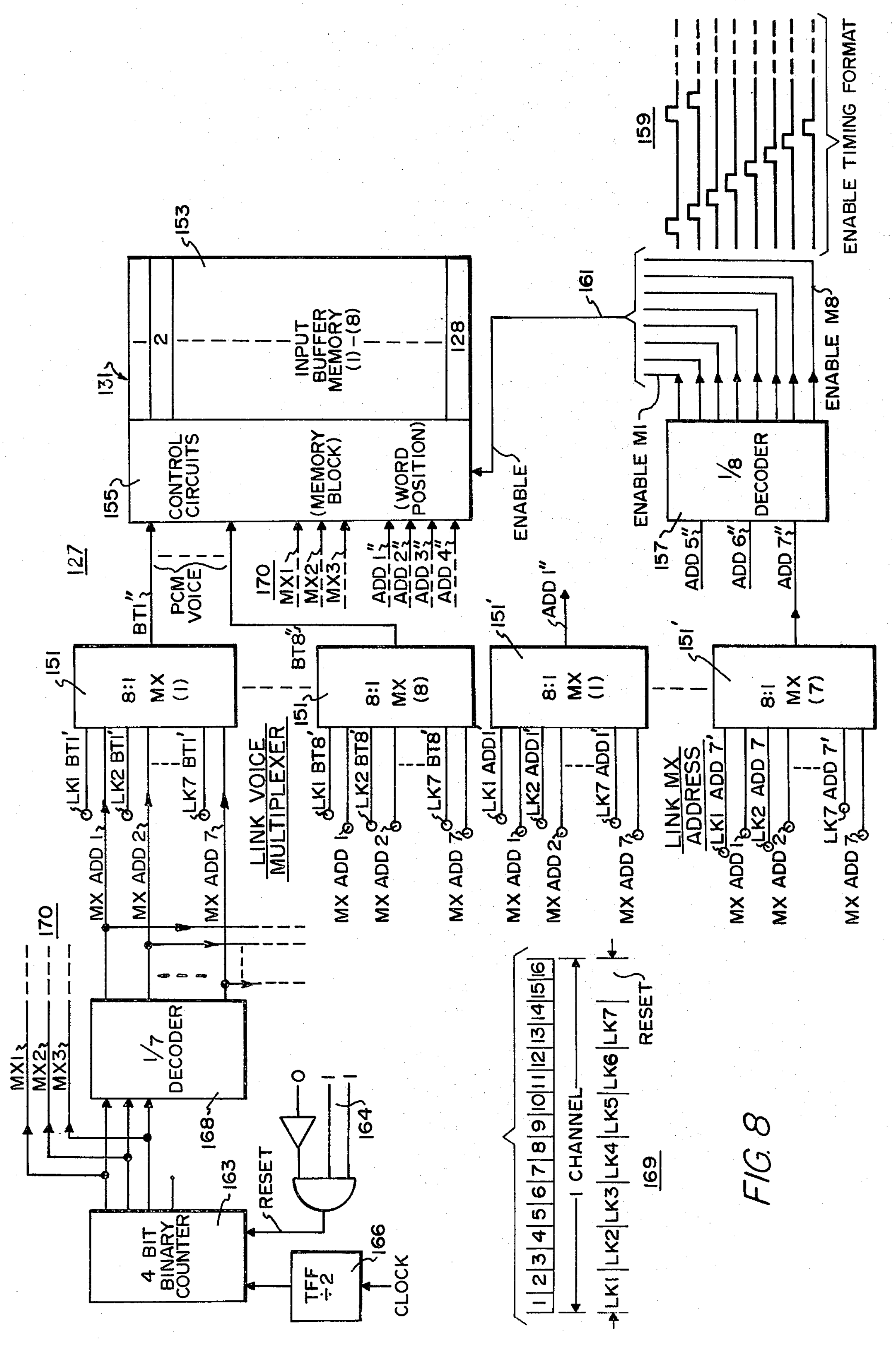

FIG. 7 is a partial block and partial schematic representation showing a channel aligner circuit individually associated with each higher order digital link; and FIG. 8 is a block diagram of a link multiplexer, associated multicounter circuit and input buffer memories associated with a known number of higher order digital links and useful for obtaining the traffic distribution pattern illustrated in FIG. 3 above.

DETAILED DESCRIPTION

Figure 1:
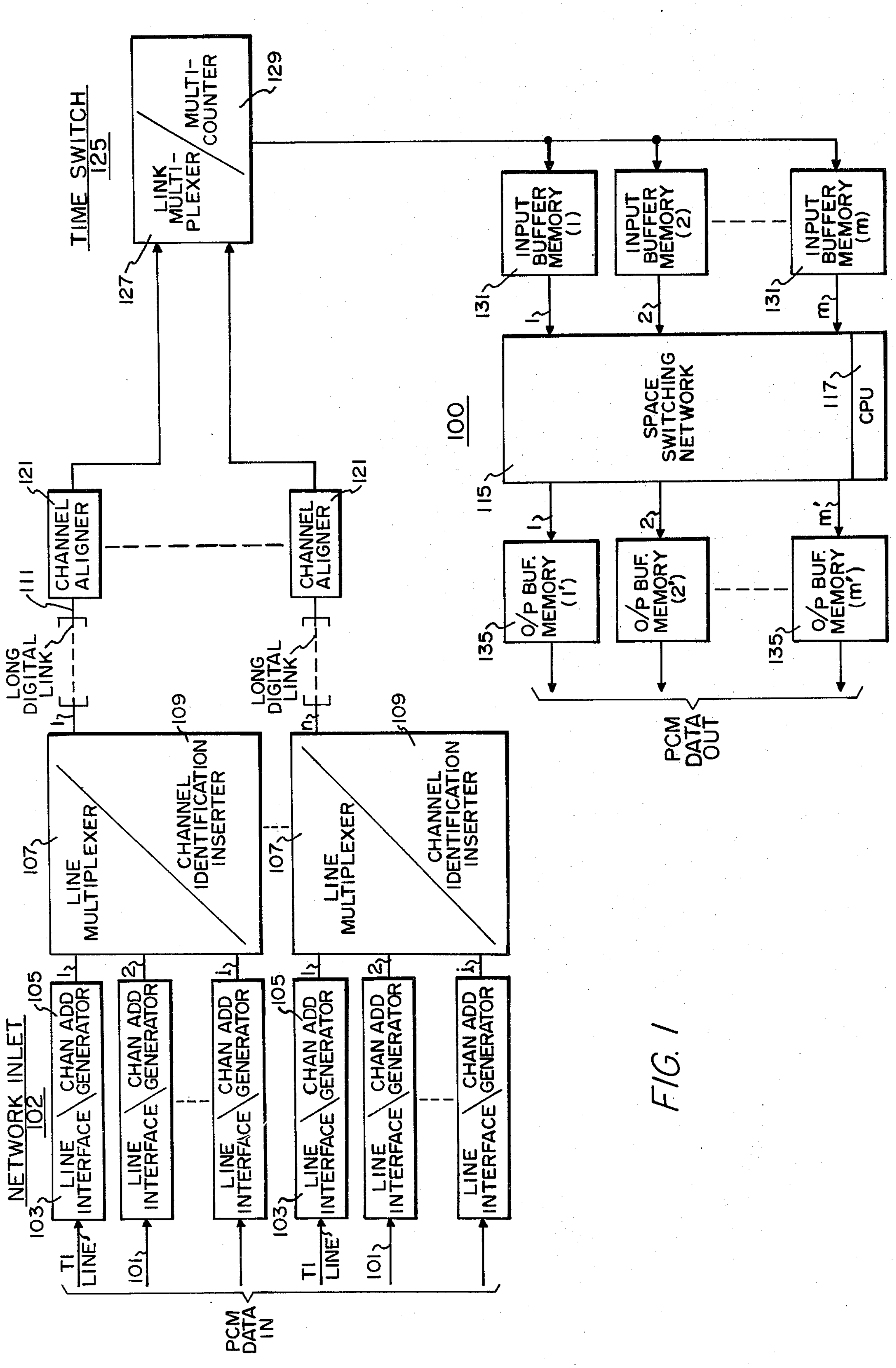
FIG. 1 is an overall functional representation in block diagram form of a time division telephone switching system useful for switching TDM PCM digital information in accordance with the invention.

FIG. 1 shows a number of T1 multiplexed carrier lines or trunks 101 of the D2 framing format, i.e., 24 channel of 8 information bits per channel, comprising the traffic load to the input ports of a time-space-time TST switching network 100. Firstly, each time division multiplex line is received by line interface equipment 103 as disclosed in U.S. Pat. No. 3,825,683 issued July 23, 1974 and assigned to the assignee of this invention. The line interface equipment 103 is comprised of a line synchronizer circuit (not shown) for correcting phase deviations in bit positions and a frame detector circuit (not shown) for providing framing integrity. The above-named U.S. Pat. No. 3,825,683 is made of reference for a more detailed explanation of these functions which are outside the scope of this invention. Secondly, for providing traffic distribtuion coding, predetermined channel address patterns are added by a channel address generator 105 to each multiplex line to increase the standard channel data of the line. Next, a line multiplexer 107 operates to further multiplex a preselected number, such as i, of T1 multiplex lines onto a higher order highway or bus called a long digital trunk link 111. Since each T1 multiplex line 101 presents 24 channel, 8 bit time frame format, the line multiplexer 107 distributes $(24.i)$ channels from $i$ number of inlet lines onto a single bus of $n$ number of busses. In accordance with one preferred practice, there are provided five T1 inlet lines and the line multiplexer 107 sequentially samples one channel from each inlet line 101 in a repetitive manner. Channel alignment is provided for each multiplexed trunk link and $(24.i)$ channels from $n$ number of trunk links are redistributed to $(24.I) - j$ channels by a link multiplexer 127 for presentation to preselected ones of $m$ buses to a network of associated input buffer memories 131, wherein the term $(24.i) - j$ is less than the quantity $(24.i)$ and $n$ is less than $m$. For proper traffic distribution coding, the inserted channel address which would properly correspond to $(24.i)$ channels requires $\log_2 (24.i)$ number of bits. Even though a single T1 inlet line 101 is frame detected and synchronized, the framing reference of each multiplex inlet line is independent of any other inlet line and thus there exists a random timing relationship between channels multiplexed from $n$ number of lines.

In the case of a very large switching network requiring an appreciable physical distance between the line multiplexer 107 which is part of the network inlet equipment 102 of this invention and the link multiplexer 127 which is part of the time switch 125 of this invention, such physical distance and resulting variations in cable lengths and associated propagation delays causes switched information from different line multiplexers to arrive at the time switch at various times. A propagation variation of greater than one bit position disturbs the channel alignment at the time switch as it distributes information from $n$ trunk links. Hence, additional information in the nature of a timing reference to maintain channel alignment is required. The higher order digital link 111 carrying $(24.i)$ channels of information would thusly require its own framing reference. However, due to the non-frame alignment between T1 inlet lines 101 and the insertion of the channel address on each T1 line, there is no need to transmit a separate framing pattern on the long digital link bus 111. Instead, only a known identification pattern is needed in order to provide channel alignment. An additional channel numbered $(24.i) + 1$ is provided for this stated purpose. In this special channel, an all zero information pattern and an odd parity bit are transmitted. This is a unique pattern which will never appear in a given channel under normal circumstances (an all zero pattern is not permitted in the D2 PCM format). The use of an odd parity bit along with all zero information makes it possible to examine a 16 bit word and utilize the same to provide automatic channel alignment via a channel aligner 121. The higher order link bus 111 is carrying $(24.i)$ channels out of an available format of $x$ channels where $x$ is greater than $(24.i)$. There are $x - (24.i)$ channels which are blank and remain available for insertion of the special channel alignment pattern. Any one of or all of these blank channels could be used for transmitting the channel alignment pattern. It is also desireable to space the occurrences of these blank channels somewhat evenly over the repeating $x$ channel format.

It is necessary to align the first or beginning channel of each higher order time frame as the information arrives at the link multiplexer 127 (time switch) through employing a channel aligner 121 on each bus. The channel aligner 111 is comprised of a 16 bit shift register that is activated by the parity bit and which register is gated to provide an output only when the stored bit pattern conforms to the unique bit pattern of the all zero channel alignment pattern. This marks the beginning of a related channel group and the occurrence of the initial channel thereof. When a complete channel group has been stored in the register, a counter is activated which then provides shift pulses causing the transfer of stored information from the aforementioned shift register to another parallel shift register, thus channel aligned information is accomplished with a minimum of hardware at maximum speed. This second parallel register provides from each trunk link to the link multiplexer 127 the information bits, the parity bit and the address bits in parallel form. Generally, as previously stated, each channel has more than $n$ time slots to multiplex the parallel information from $n$ buses for the purpose of writing into $m$ number of memories. The object is to utilize the inserted channel address and an added multiplexer address as explained in detail hereinafter to achieve system modifications which result in hardware simplicity and flexibility, for addressing m memories such that the incoming channels are more evenly distributed to provide the desired essentially non-blocking traffic pattern.

It is herein disclosed to rearrange the channel address and the multiplexer address such that (1) the least significant bits of the channel address define the number of the *m* bus and thus the buffer memory associated therewith: (2) the multiplexer address defines a block of words within the buffer memory; and (3) the remainder (most significant) of the channel address bits define the word position within the memory block selected. The usage is such that the least significant bits LSB of the channel address are used to enable the selected memory and the most significant bits MSB of the channel address together with the special multiplexer address are used for addressing the memory words. This usage permits obtaining the correct memory selection by a mere change of wiring pattern of the multiplexer address equipment for each higher order link bus and does not require logic manipulation.

In greater detail, therefore, a plurality of the PCM transmission lines 101 of the commercially available T1 carrier format, i.e., comprised of 125 microseconds, time frames, 24 channels per time frame and 8 binary digits or bits constituting the message sample transmitted over one channel time, are received by the network inlet 102 for the telephone time division switching system 100. The network inlet 102 is comprised of the line interface circuit 103 and the channel address generator circuit 105 individually associated with each incoming T1 multiplex line 101 of *i* number of such T1 lines 101. The (24.*i*) number of PCM information channels, i.e., assuming full data usage of the 24 channel T1 format and ignoring for the purpose of simplifying the explanation herein any transmission of a framing code in the 24th channel of every time frame, are next multiplexed by the line multiplexer circuit 107 which includes a channel identification inserter circuit 109 onto the higher order digital link 111 of which *n* number are shown.

Figure 2:
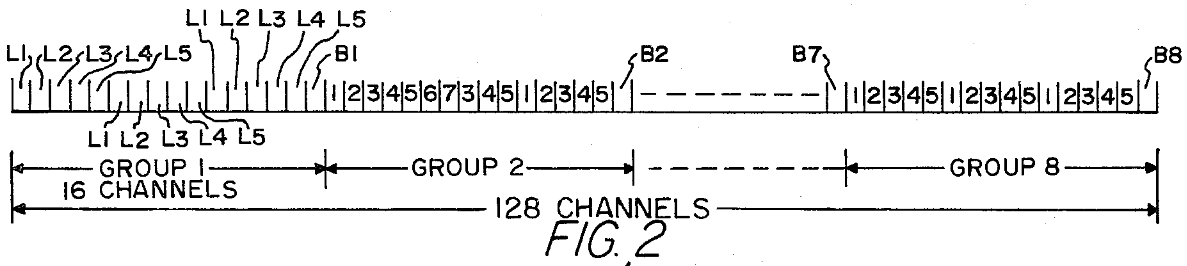
FIG. 2 is a graphical representation of the time slot framing format of a large number of T1 inlet lines multiplexed onto a higher order long distance digital link.

FIG. 2 shows the resulting multiplexed framing format present on a selected one of the higher order digital links 111. Conveniently determined from a maximum available 128 channel higher order time frame, there are provided 8 groups of 16 channels, each containing 15 channels of information sequentially sampled from *i* number of T1 lines 101. Therefore, it is convenient to provide no more than five T1 lines 101 so that *i*=5 and the illustrated distribution pattern of FIG. 2 is obtained, to wit: channels 1–5 of each group are occupied by randomly chosen channels of 24 channels from incoming T1 lines 101 represented as L1–L5, respectively; channels 6–10 thereof are likewise occupied by different channel information from inlet lines L1–L5, respectively; channels 11–15 thereof are occupied by still different channel information from inlet lines L1–L5, respectively; and all channels 16 thereof are left unoccupied or blank and are represented by reference characters B1–B8, respectively. The following table, TABLE 1, shows the channel occupancy pattern for each inlet line L1–L5 within each group of 16 channels for the format of FIG. 2, namely:

TABLE 1

| Inlet Line | CHAN. | CHAN. | CHAN. |
|---|---|---|---|
| L1 | 1 | 6 | 11 |
| L2 | 2 | 7 | 12 |
| L3 | 3 | 8 | 13 |
| L4 | 4 | 9 | 14 |
| L5 | 5 | 10 | 15 |

Hence, it is readily seen that any selected inlet line of the five inlet lines 101 is sampled three times in each group of channels and a total of 24 times during each 128 channel time frame. Ergo, all of the originally transmitted 24 channels of each inlet line 101 have now been sampled and multiplexed onto an associated higher order link 111 and will be next subjected to a traffic distribution load balancing technique prior to being made available to a space switching network 113. The space switching network 113 operates under the control of a standard computer known in the art as a central processor unit CPU represented in FIG. 1 at 117.

It is in accordance with the timing function required within the network inlet 102 to speed up the information transmission capacity of a given higher order channel. That is to say that where beforehand each lower order channel of 5.2 microseconds contained 8 bits, each higher order channel of 5.2 ms contains 16 bits, namely, 8 PCM voice bits sampled from a selected one of inlet lines L1–L5, 7 channel address bits which are instrumentally employed in the subsequent traffic distribution and one parity bit used for timing purposes. The channel identification inserter 109 comprises part of the line multiplexer 107 as will be described more fully hereinafter and is employed to generate a known special information pattern, such as all zero bit information, useful for identifying the end of one related group of higher order channels and the beginning of an immediately following related group thereof, as earlier discussed. It is thought not to be required for data integrity to transmit the special channel identification pattern in all 8 blank channels B1–B8, as one transmission thereof in each 128 channel time frame would likely suffice for channel identification; however, there are eight blank channels available for use in each 128 channels plus it is quite convenient to space the blank channels B1–B8 to occur once in each group of eight such groups for marking the end of its associated group and for providing faster channel alignment.

Each long digital link 111 is provided with an associated channel aligner circuit 121 which is shown in greater detail in FIG. 7. The channel aligner 121 is provided to recognize the special channel identification inserter pattern which marks the beginning of a repeated 16 channel transmission on the higher order bus 111. Accordingly, the PCM voice bits, the channel address bits and the parity bit on each of 15 successive channels become identifiable and can be transferred to the immediately following time switch 125. The time switch 125 is comprised of the link multiplexer 127 and a multicounter circuit 129 that is used with the operation of the PCM voice multiplexing function of the link multiplexer 127. The link multiplexer 127 operates to redistribute, on a greater number of lines than the number of long digital links, the information of 120 out of 128 channels into an information pattern of 105 out of 128 channels to achieve a load balancing or traffic averaging effect by lowering the occupancy per line of the carrier to a level below that existing on the input T1 multiplex lines 101. The link multiplexer utilizes the binary information of the 7 bit channel address in a particular manner as set forth in detail hereinafter to determine therefrom the desired distribution pattern to be accorded the accompanying 8 PCM voice bits. The 8 PCM bits are selectively assigned to 8 input buffer memories 131, respectively.

In FIG. 1, there are m number of input buffer memories 131 shown and it is to be understood that each input buffer memory unit 131 contains 128 available memory word positions or slots. In the broadest consideration of the time switch 125 of FIG. 1, *x* out of *y* higher order channels are distributed to *m* number of buffer memory units 131 while obtaining therefrom *z* out of *y* channel traffic distribution, wherein $x=120$, $y=128$, $m=8$ and $z=105$. The input buffer memories 131 provide stored information to the space switching network 115 under the control of the CPU 117 in a manner well known in the art of telephony and the space switching data is transferred for storage to a bank of output buffer memories 135, shown in FIG. 1 as 1' through *m'*, for indicating that such output buffer memories 135 are identical to the input buffer memories 131 in the number provided and in their internal configuration of memory word slots. PCM data output can be taken from the time division switching network 100 directly from the multiple outputs of the output buffer memories 135.

FIG. 3 shows a matrix of 8 × 8 memory blocks and eight control circuits conveniently arranged so that each vertical row of eight memory cells and the associated topmost control circuit cell is representative of an input buffer memory unit 131. Input buffer memory units 1–8 are represented by the designations M1–M8 and it is to be noted that for a single buffer memory say M1, the eight memory cells are the same as the aforementioned memory blocks to which the channel address bits are functionally related. The configuration of each memory block is shown clearly in FIG. 3 to consist of 16 separate word memory positions or slots. The 16th word position in each of seven memory blocks remains blank or unoccupied and the entire lowermost or eighth memory block is not utilized for storage of PCM data. It is to be pointed out that the data groups 1–7 are representative of the multiplexed information from the seven long digital links 111, respectively, and that FIG. 3 is representative of the unique traffic distribution action of the time switch 125 in cooperation with the eight input buffer memory units 131. Fifteen word positions of seven memory blocks, i.e., 105 memory slots, are utilized and not 120 memory slots which would be the case if the data of 120 out of 128 channel positions was connected directly into the input buffer memory units 131. Thus, the time switch 125 is useful to lower the time frame channel occupancy to a level below that available on the input lines 101 or the digital links 111. FIG. 3 demonstrates that the 120/128 channel occupancy level of the data groups 1–7 is distributed to a selected memory block of each of the 8 buffer memory units 131 and is available out in the ratio of 105/128 channel occupancy level. The particular distribution pattern is fully detailed in TABLE 2, to wit:

TABLE 2

| | DATA GROUP 1, LINK 1 | | | | |
|---|---|---|---|---|---|
| CHANNELS | LINE 1 | LINE 2 | LINE 3 | LINE 4 | LINE 5 |
| 1 | M1,W1 | M1,W4 | M1,W7 | M1,W10 | M1,W13 |
| 2 | M2,W1 | M2,W4 | M2,W7 | M2,W10 | M2,W13 |
| 3 | M3,W1 | M3,W4 | M3,W7 | M3,W10 | M3,W13 |
| 4 | M4,W1 | M4,W4 | M4,W7 | M4,W10 | M4,W13 |
| 5 | M5,W1 | M5,W4 | M5,W7 | M5,W10 | M5,W13 |
| 6 | M6,W1 | M6,W4 | M6,W7 | M6,W10 | M6,W13 |
| 7 | M7,W1 | M7,W4 | M7,W7 | M7,W10 | M7,W13 |
| 8 | M8,W1 | M8,W4 | M8,W7 | M8,W10 | M8,W13 |
| 9 | M1,W2 | M1,W5 | M1,W8 | M1,W11 | M1,W14 |
| 10 | M2,W2 | M2,W5 | M2,W8 | M2,W11 | M2,W14 |
| 11 | M3,W2 | M3,W5 | M3,W8 | M3,W11 | M3,W14 |
| 12 | M4,W2 | M4,W5 | M4,W8 | M4,W11 | M4,W14 |
| 13 | M5,W2 | M5,W5 | M5,W8 | M5,W11 | M5,W14 |
| 14 | M6,W2 | M6,W5 | M6,W8 | M6,W11 | M6,W14 |
| 15 | M7,W2 | M7,W5 | M7,W8 | M7,W11 | M7,W14 |
| 16 | M8,W2 | M8,W5 | M8,W8 | M8,W11 | M8,W14 |
| 17 | M1,W3 | M1,W6 | M1,W9 | M1,W12 | M1,W15 |
| 18 | M2,W3 | M2,W6 | M2,W9 | M2,W12 | M2,W15 |
| 19 | M3,W3 | M3,W6 | M3,W9 | M3,W12 | M3,W15 |
| 20 | M4,W3 | M4,W6 | M4,W9 | M4,W12 | M4,W15 |
| 21 | M5,W3 | M5,W6 | M5,W9 | M5,W12 | M5,W15 |
| 22 | M6,W3 | M6,W6 | M6,W9 | M6,W12 | M6,W15 |
| 23 | M7,W3 | M7,W6 | M7,W9 | M7,W12 | M7,W15 |
| 24 | M8,W3 | M8,W6 | M8,W9 | M8,W12 | M8,W15 |

For data group 1, the PCM data from channels 1–24 of the first inlet line L1 is stored in the first 3 word positions of the topmost memory block of all eight buffer memories M1–M8 through storing channels 1–8 data in word position 1 of buffer memories M1–M8, chanels 9–16 data in word position 2 thereof and channels 17–24 data in word position 3 thereof. The traffic distribution for the other inlet lines L2–L5 should now be apparent from the explanation given above when considering the tabulation of TABLE 2. Further, it should be apparent that the distribution pattern of TABLE 2 is repeated for each of the data groups 2–7.

Figure 4:
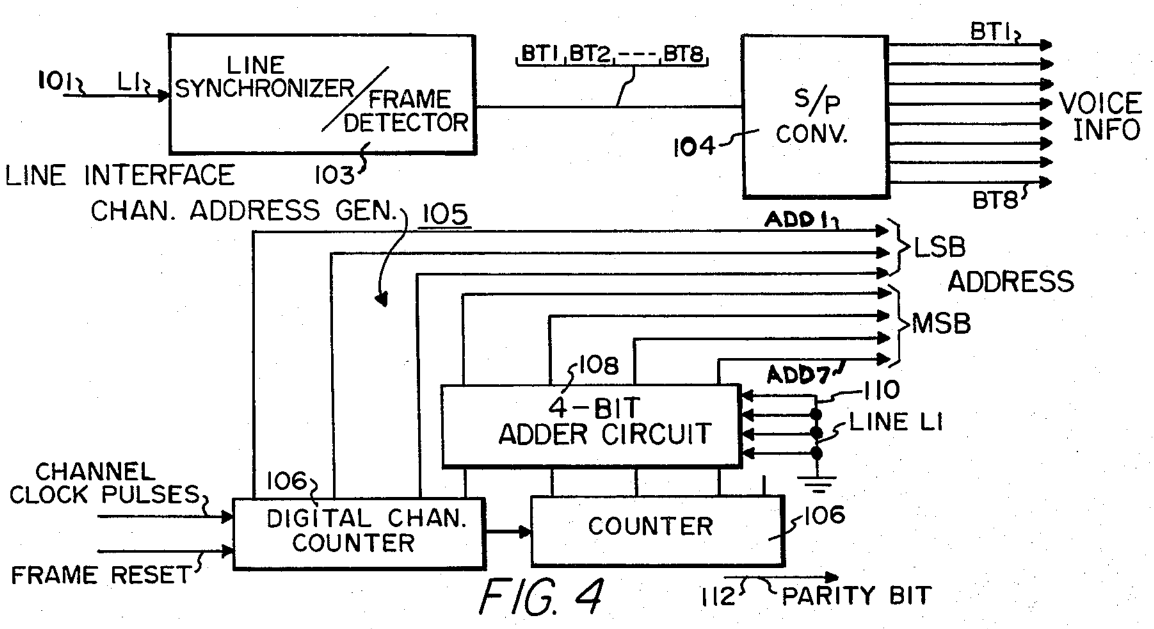
FIG. 4 is a block diagram representation of a line interface and channel address generator which are individually associated with each T1 inlet line.

As shown in FIG. 4, a given T1 PCM line 101, arbitrarily chosen to be line L1, firstly is routed into line synchronizer and frame detector equipment 103 for correcting minor phase deviations of the PCM data format in a known manner. The 8 bit serial format of BT1–BT8 that emerges then is synchronized for entry into the time switch 125 but it should again be noted that the information on line L1 is nor synchronized with respect to any other incoming line 101 as was earlier explained. Next, the serial PCM data is progressed through a serial to parallel converter 104 in order to provide eight parallel outputs BT1–BT8 comprising the voice information of a 16 bit channel comprising the aforementioned second time frame format. In accordance with the invention, the channel address generator 105, is needed to generate a seven bit channel address which is used to determine the traffic distribution of the PCM data in the operation of the time switch 125. The manner of deriving the channel address is shown in detail in FIG. 4 wherein two 4 output terminal digital channel counters 106 are interconnected so as to provide an accumulative sequential count of 7. The digital counters 106 may be commercially available synchronous 4-bit counters such as Texas Instrument circuit types SN54160 et al. The first three outputs of the leftmost digital counter 106 in FIG. 4 comprise three of the 7 channel address bits, namely, addresses ADD 1, ADD 2 and ADD 3 which are the least significant bits thereof. Additionally, there is provided a conventional 4-bit adder circuit 108 such as Texas Instrument circuit type SN54LS83 et al., which receives the remaining four digital counter inputs and operates to alter the value thereof in accordance with the electrical condition of a 4 terminal input 110. The 4 output terminals of the adder circuit 108 then comprise the remainder or the most significant bits of the channel address bits, namely ADD 4, ADD 5, ADD 6 and ADD 7. The particular traffic distribution pattern desired with respect to the eight input buffer memories 131 can be obtained through controlling (hardwiring) the 4 input leads 110. That is to say the channel distribution into the buffer memory 131 that is set forth in TABLE 2 above can be obtained by setting the binary value of the 4 input leads 110 in accordance with TABLE 3 below:

TABLE 3

| LINE | BINARY VALUE | BINARY ADD |
|---|---|---|
| L1 | 0000 | 0 |
| L2 | 0011 | 3 |
| L3 | 0110 | 6 |
| L4 | 1001 | 9 |
| L5 | 1100 | 12 |

A binary one is obtained by a +5 volts and binary zero is obtained by grounding the respective input terminal 110. Therefore, for line L1, the desired traffic distribution is obtained by grounding the 4 input terminals 110 as is clearly illustrated in FIG. 4. Accordingly, word positions 1–3 of the selected memory block in eight input buffer memories 131 is utilized for line L1 information as given by TABLE 2 above. Likewise, word positions 4–6, 7–9, 10–12, and 13–15 are utilized for lines L2–L5 information, respectively. The digital counter 106 operates at the frequency of the system clock pulse rate and upon the formation of a 7 bit channel address, the digital counter 106 is reset. Finally, a parity bit is added, as shown at 112, for comprising the 16th bit of the channel address.

Figure 5:
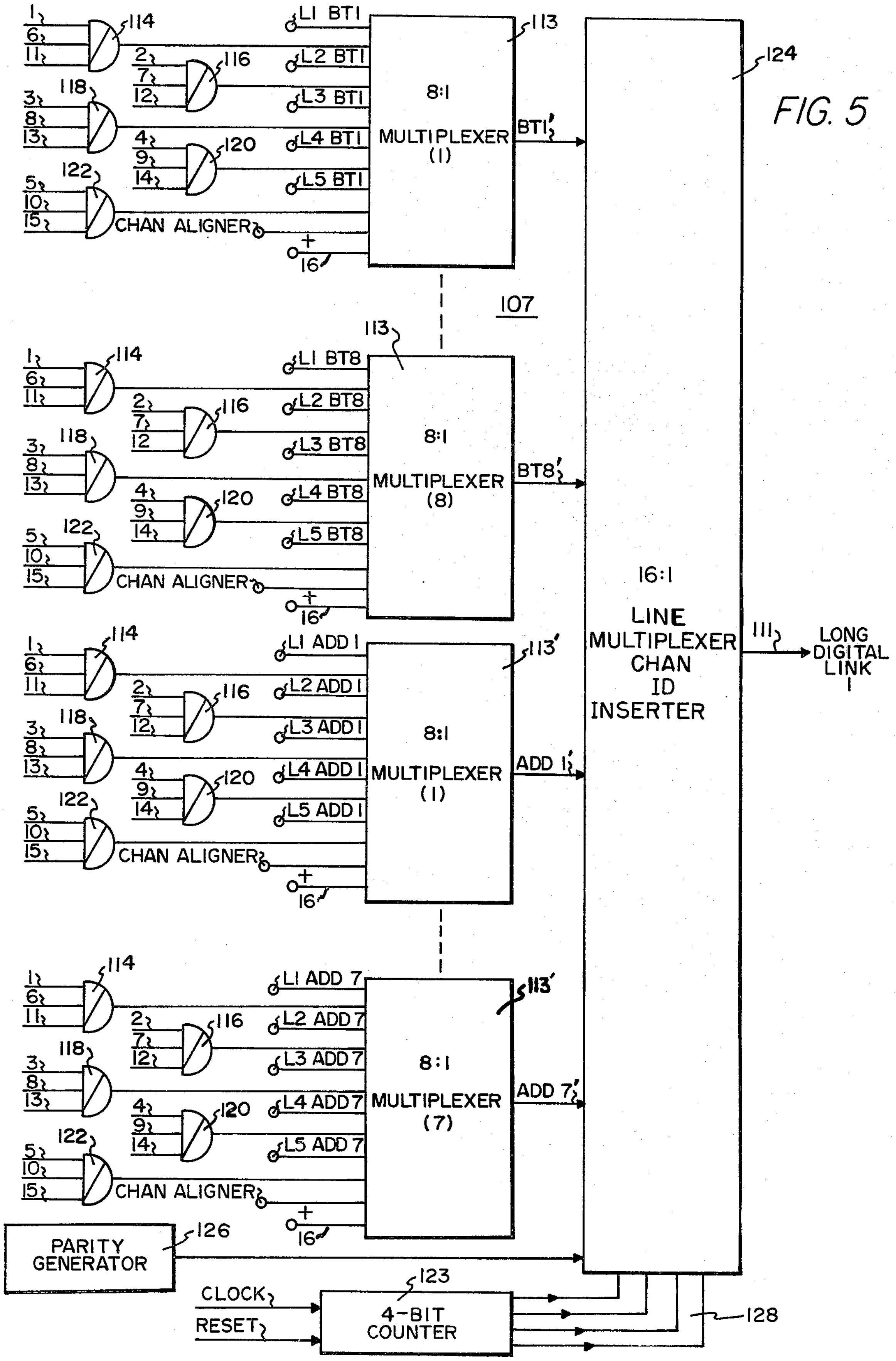
FIG. 5 is a block diagram of a line multiplexer and channel identification inserter circuit associated with predetermined groupings of T1 inlet lines.

FIG. 5 shows the detailed operation of the line multiplexer 107 and channel identification inserter 109. What is shown is a series of eight 8:1 ratio multiplexers 113 of the Texas Instrument circuit type SN54151 et al. being used to receive PCM voice data from lines L1–L8, respectively. For example, the 8 parallel PCM bits BT1–BT8 of FIG. 4 are connected to L1 BT1–L1 BT8 leads of the eight multiplexers 113, respectively. The circuit of FIG. 4 should be understood to be repeated for lines L2–L5 with appropriate wiring changes at 110 according to TABLE 3. The parallel voice bits therefrom are connected to corresponding leads L2 BT1–L2 BT8 through L5 BT1–L5 BT8, respectively. In a like manner, there are provided another series of seven 8:1 ratio multiplexers 113′ of the same circuit type, i.e. SN54151, for receiving the 7 bit channel address of each line L1–L5. For example, the 7 parallel channel address bits ADD1–ADD7 of FIG. 4 are connected to L1 ADD1–L1 ADD7 leads of the seven multiplexers 113′, respectively. Further, channel address bits for lines L2–L5 are connected to multiplexer input leads L2 ADD1– L2 ADD7 through L5 ADD1–L5 ADD7, respectively. Referring to the PCM multiplexer 113 in FIG. 5, there are shown five logic OR gate circuits 114, 116, 118, 120 and 122, which operate to enable an associated data lead. The three numbers which are designated in FIG. 5 as inputs to the OR gates correspond to the patterns of channel positions given in TABLE 1. Logic OR gates 114, 116, 118, 120 and 122 are repeated to enable the associated PCM leads L1 BT2–L5 BT2 through L1 BT8–L5 BT8 and address leads L1 ADD1–L5 ADD1 through L1 ADD7–L5 ADD7, respectively, as is clearly shown in FIG. 5. That is, the logic gates 114 et al. enable the multiplexer to accept data from leads L1 BT1 through L5 BT1, respectively. The logic gate 114 is enabled by a positive logic signal present upon any single one of the three inputs which inputs are connected to receive information from line L1. L1 information reoccurs in each group of 16 channels in channel positions 1, 6 and 11 thereof. Line L2 reoccurs in each 16 channel group in channel positions 2, 7 and 12 thereof, and so forth.

The eight multiplexers 113 and the seven multiplexers 113′ are shown in FIG. 5 to include a channel aligner lead and another lead designated with a 16 code number. The code 16 designates the start of the 16th channel position in each 16 channel group, groups 1–8 in FIG. 2, and then enables each multiplexer to accept information which may be avilable on the channel aligner lead. As earlier stated, the 16th channel is comprised of an all zero pattern except for an odd parity bit. The desired channel address pattern, i.e. an all zero pattern, can be obtained through control of the illustrated channel aligner leads of FIG. 5. For example, an all zero pattern is obtained through grounding the channel aligner leads. With each enablement of the respective gates 114 et al., each multiplexer 113 provides a single PCM output bit gated from one of the multiple input leads to then comprise from all eight multiplexers 113 a parallel eight bit output BT1′–BT8′. Likewise, the seven multiplexers 113′ develop a parallel 7 bit output of ADD1′–ADD7′. The prime designation indicates one further operative step of the 8:1 ratio multiplexers subsequent to the generation of the channel address bits in block 105.

Figure 6:
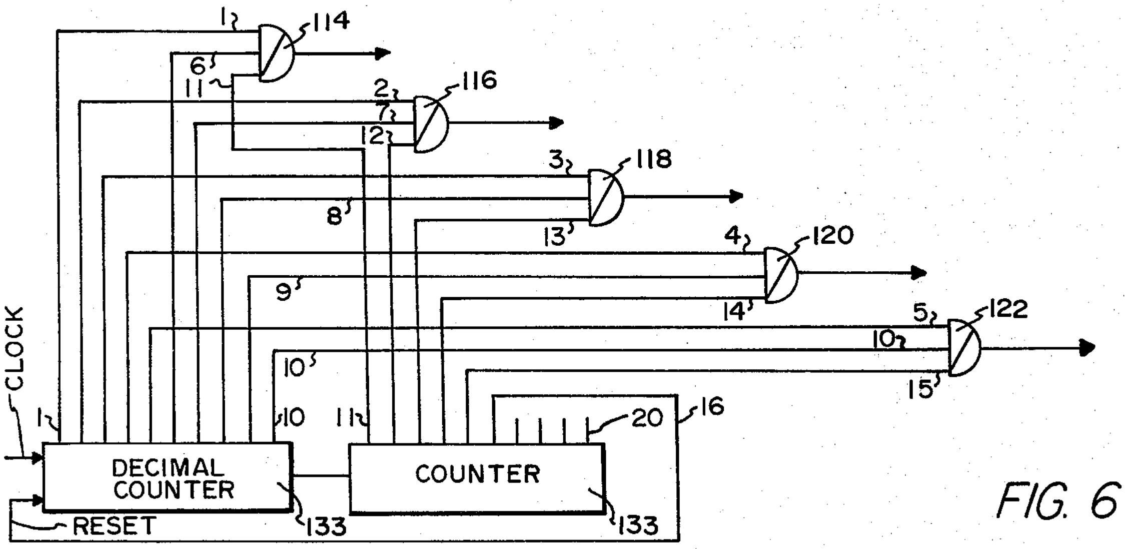
FIG. 6 is a partial schematic of a timing circuit employed in connection with the line multiplexer of FIG. 5.

Now, a 16:1 ratio multiplexer 124 is provided to receive as inputs the eight parallel PCM bits BT1′–BT8′ and the 7 address bits ADD1′–ADD7′ and a 16th parity bit. The multiplexer 124 is provided to multiplex 16 bit data onto an associated long digital link 111. FIG. 5 shows the first LK1 long digital link 111 (out of 1 to *n* such links) of links LK1 through LK7 which interconnect the multiplexer 107 with the channel aligner 121 for seven network inlet groups 102. The 16:1 multiplexer 124 is of circuit type SN54150 et al. manufactured by Texas Instruments. The parity bit or 16th bit is shown to be generated by a parity generator 126 and thereafter provided directly to the 16:1 multiplexer 124. The parity generator 126 is of a standard circuit type such as Texas Instruments circuit type SN54180 et al. A 4-bit binary counter circuit 123, FIG. 5, has a clock pulse input lead and a reset input lead and provides four output leads 128 which are interconnected to the 16:1 multiplexer 124. The 4-bit binary counter 123 is of the Texas Instruments circuit type SN54160 et al. The output leads 128 therefrom are used as inputs to data select leads of the 16:1 multiplexer 124. FIG. 6 shows the timing circuit wherein the inputs for the logic gates 114 et al are developed. As shown therein, two 10-count decimal counters 133 are interconnected in order to provide an accumulative sequential count of 16. The operations of the decimal counters 133 are controlled according to the clock pulse input thereto and the counters 133 are reset by the occurrence of the 16th count thereof.

The channel aligner circuit 121 is shown in FIG. 7 wherein the first long digital link LK1 is inputted to a conventional 16-bit shift register 136. The register 136 is shown to provide at the top most portion thereof as shown in FIG. 7, 16 outputs connected to a pair of logic NAND gates 139 and 140. The outputs of gates 139 and 140 are inverted in their logic state by the operation of logic inverter gates 141 and 143 and used to input another logic NAND gate 142. The output of the gate 142 is used to trigger a 1–16 binary counter 144, which counter 144 provides a shift pulse to the register 136 for every 16th count of the binary counter 144. The counter 144 operates at the frequency of the clock pulse input 145 and is reset, see lead 147, for each channel occurrence. The operation of the channel aligner circuit 121 is begun when the all zero channel identification inserter pattern has been received into the shift register 136. Only at this time are the inputs to the NAND gates 139 and 140 positive. Thereafter, the binary counter 144 starts to count and the register 136 begins to sequentially store the incoming information from the long digital link LK1. Upon a full 16 counts being accumulated by the binary 144, the shift pulse is sent to the register 136 causing the stored data thereof to be shifted or transferred to a second parallel 16-bit shift register 138. The second register 138 then provides eight parallel PCM voice bits BT1′–BT8′ and 7 channel address bits ADD1′–ADD7′ and a parity bit which are interconnected to the link multiplexer 127 as shown in FIG. 8. It should be understood that the circuit of FIG, 6 is repeated for the eight multiplexers 113 and the seven multiplexers 113′ and the circuit of FIG. 7 is repeated for n number of long digital links LK1–LKn, or since $n$=7 in the illustrated embodiment of the drawing, is repeated for seven links LK1–LK7.

Finally, FIG. 8 shows the link multiplexer circuit 127 in the unique and particular manner in which the link multiplexer 127 distributes switched PCM data to the input buffer memory units 131. The link multiplexer 127 includes eight 8:1 ratio multiplexers 151 generally of the circuit type SN54151 et al. commercially available from Texas Instruments. The 8:1 multiplexers 151 receive PCM bits BT1′ through BT8′ from the channels transmitted over the long digital links LK1–LK7, respectively, when properly enabled by coding inputs similarly to that provided by the logic gates 114 et al. shown in use with the multiplexer 107. The eight 8:1 multiplexers 151 provide eight parallel PCM bits BT1″–BT8″ for presentation to the control circuits 155 of the input buffer memories 131. Only one input buffer memory 131 is shown in FIG. 8 and is indicated as (1)–(8) so that the reader will keep in mind that there are eight such buffer memories M1–M8, each being similarly comprised of 128 separate word positions, indicated at 153, conveniently divided into eight distinct memory blocks of which only seven are utilized, FIG. 3. Further, associated control circuits 155 provide for the distribution of PCM voice information and coding identification of the channel address bits.

In addition, the link multiplexer 127 includes seven 8:1 multiplexers 151′ which receive the ADD-1′–ADD7′ channel address bits from the long digital links LK1–LK7, respectively, when appropriately enabled by the same coding inputs utilized with the PCM voice 8:1 multiplexers 151, and also provide therefrom 7 parallel address bits ADD1″–ADD7″ for input to the control circuits 155 of the input buffer memories 131. For the purpose of enabling the appropriate buffer memory 131, there is provided a 1:8 decoder circuit 157 of a standard type for receiving as inputs thereto the least significant address bits of the 7 address bits, namely ADD5″–ADD7″, from the address multiplexers 151′. The PCM multiplexers 151 have been identified in FIG. 8 as link voice multiplexers and the address multiplexers 151′ have been identified in FIG. 8 as link multiplex addresses.

The decoder circuit 157 provides eight outputs shown at 161 and called Enable M1 through Enable M8. The decoder outputs are suitably timed to provide the enable timing format shown at 159 effective to sequentially enable the eight input buffer memories 131 according to the coding of the address bits ADD5″–ADD7″ as determined from TABLE 3 information. The most significant address bits ADD1″–ADD4″ are inputted to the control circuits 155 of the particular input buffer memory 131 that is enabled by the decoder circuit 157. The address bits ADD1″–ADD4″ are determinative of which word position 1–15 will be utilized for storage in the selected memory block of seven such memory blocks. Three coding inputs MX1–MX3 are shown at 170 which are determinative of the selected memory block within an enabled input buffer memory 131. These inputs are shown in FIG. 8 to be derived from 3 output leads of a 4-bit binary counter 163. The gating circuit arrangement shown at 164 provides a reset upon the occurrence of binary digits 011. A toggle flip-flop TFF circuit 166 divides the clock frequency by two so that the binary counter 163 is inputted every two bit positions of the normal 16 bit channel. The result is that the information taken from the long digital links LK1–LK7 is according to the timing format shown at 169 in FIG. 8. The binary counter 163 also inputs the multiplex coding signals MX1–MX3 to a 1:7 decoder circuit 168 which provides seven multiplex address codes MX ADD1–MX ADD7. These coding signals are inputted to all eight of the multiplexers 151 and all seven of the multiplexer 151′ for selectively enabling the PCM or address lead situated immediately above the coding lead when viewed in FIG. 8.

It is to be understood that while the present invention has been shown and described with reference to the preferred embodiments thereof, the invention is not limited to the precise forms set forth, and that various modifications and changes may be made therein without departing from the spirit and scope of the present invention.

What is claimed is:

1. A time division switching system comprising: a plurality of input time division multiplex lines carrying 24 channel multiplexed PCM data, a space switching network having a different plurality of input and output ports associated therewith and output multiplex lines connected to said output ports, network inlet means receiving said input multiplex lines and providing synchronization and frame detection for said multiplexed PCM data, said network inlet means including channel address data generator means for inserting channel address data to accompany said multiplexed PCM data, means for multiplexing and distributing on a plurality of supermultiplexed lines said PCM data and said channel address data to provide therefrom a supermultiplexed time frame format and including channel indentification inserter means for inserting channel indentification coding in said supermultiplexed format channel aligner means cumulatively receiving said supermultiplexed format for separately outputting said PCM data and said channel address data, said channel aligner means referencing the selection of said PCM and said channel address data from said supermultiplexed format according to said channel identification coding, means for distributing said PCM data according to the coding of said channel address data, said distributing thereof providing another multiplexed time frame format having a lower channel occupancy level per line than said supermultiplexed format and distributed on a plurality of multiplex lines greater than said number of supermultiplexed lines, means for storing said PCM data as distributed, and means for controlling the transferring of stored PCM data to said switching network inlet ports according to said other multiplexed time frame format and controlling said switching network for switching said PCM data from said inlet to said outlet ports thereof.

2. A time division switching system as claimed in claim 1 wherein said PCM data and said channel address data occupy $x$ out of every $y$ channels and the channel address coding controls said distributing means to redistribute to said storage means in a load balancing pattern of $z$ out of every $y$ channels wherein $x$ is greater than $z$ and less than $y$.

3. A time division switching system as claimed in claim 2 wherein $i$ number of input multiplex lines are multiplexed by said multiplexing and distributing means onto a selected one of $n$ number of long digital carrier links for carrier transmission of said supermultiplexed time frame format having $y$ number of repeating channels, and the PCM data on said $n$ number of carrier links is redistributed by said distributing means to $m$ number of storage means, each thereof having $y$ number of storage positions to accept said PCM data therein wherein $i$ is less than $n$ and $n$ is less than $m$.

4. A time division switching system as claimed in claim 3 wherein $i$ is equal to 5, $n$ is equal to 7, $m$ is equal to 8, $y$ is equal to 128, $x$ is equal to 120 and $z$ is equal to 105.

5. A time division switching system as claimed in claim 1 wherein said supermultiplexed format is comprised of repeating channel time frames of 128 channels of 16 bits each with said PCM data and said channel address data comprised of 8 bits and 7 bits of every repeating channel thereof, said channel identification pattern is comprised of 15 bits of every 16th repeating channel thereof and each 16th bit of every repeating channel comprises a selected parity bit.

6. A time division switching system as claimed in claim 5 wherein said channel aligner means is comprised of a first storage register means which is adapted to accumulate said PCM and said channel address data when activated, binary counter means for activating said first storage register and for causing said first storage register to shift the accumulated data thereof upon the occurrence of every repeating channel when said binary counter means is activated by the occurrence of said channel identification coding, and a second storage register means adapted to receive said accumulated PCM and channel address data and provide separate outputs therefor.

7. A time division switching system as claimed in claim 1 wherein said means for storing said PCM data is comprised of a plurality of input buffer memory devices, each thereof having a plurality of memory stores to correspond to the maximum number of channels of said supermultiplexed time frame format, said plurality of memory stores being grouped into a number of blocks of said memory stores and said number corresponding to said plurality of memory devices, and the least significant bits of said channel address data are used to determine which memory device will be distributed to and the most significant bits of said channel address data are used to determine which memory stores will be distributed to within the selected memory device.

8. A time division switching system as claimed in claim 7 wherein said distributing means is a multiplexer means and includes multiplexer address coding data which is used to determine which memory block of said selected memory device will be distributed to.

9. In a communication switching system, a plurality of input time division multiplex lines carrying PCM data, a switching network having a plurality of inlet ports and a corresponding plurality of outlet ports thereto, line interface means for synchronizing and frame aligning said incoming PCM data, channel address generator means for providing channel address coding data for insertion with said PCM data, a plurality of long digital carrier links, means for multiplexing and distributing said PCM data and said channel address data onto selected ones of said long digital links for transmission therealong, channel identification means for repeatedly inserting a channel identification coding pattern with said PCM data and said channel address data, channel aligner means for aligning the transmission of said PCM data and said channel address data with the repeating occurrences of said channel identification pattern, a plurality of input buffer memory means, means for distributing said PCM data to said input buffer means for storage therein according to the coding of said channel address data, said distributing thereof providing a multiplexed time frame format on a plurality of multiplex lines having a lower channel occupancy level per line than exists on either said input multiplex lines or said long digital links distributed on a plurality of multiplex lines greater than said plurality of long digital link lines, and means for controlling the transferring of stored PCM data to said switching network inlet ports according to said lower occupancy level time frame format and controlling said switching network for switching said PCM data from said inlet to said outlet ports thereof.

10. A communication switching system comprising a plurality of input time division multiplex lines carrying PCM data arranged in repeating 24-channel 8-bit time frame format, said plurality comprised of $n$ groups of $i$ where $i$ is less than $n$, channel address generator means for providing channel address coding data to be inserted with each 8-bit sample of said PCM data, $n$ number of long digital carrier links, means for selectively multiplexing and distributing said PCM data and said channel address data onto said carrier links for transmission therealong, channel identification means for intermittently inserting a channel identification coding pattern with said PCM data and said channel address data, $n$ number of channel aligner means for aligning the transmission of said PCM data and said channel address data with the repeating occurrences of said channel identification pattern, $m$ number of input buffer memory devices where $m$ is greater than $n$, means for distributing said PCM data to said input buffer memory devices for storage according to the coding of said channel address data, said distributing thereof being according to a multiplexed time frame format on *m* multiplex lines having a lower channel occupancy level per line than exists on either said input multiplex lines or said long digital links distributed on a plurality of multiplex lines, *m*, greater than said number, *n*, of long digital links, *m* number of output buffer memory devices, a switching network having *m* number of inlet ports and outlet ports thereto, respectively, and means for controlling the transferring of stored PCM data to said switching network inlet ports according to said lower occupancy level format and controlling said switching network for switching said PCM data from said inlet to said outlet ports thereof.

* * * * *